US008667050B2

(12) United States Patent  (10) Patent No.: US 8,667,050 B2
Momchilov  (45) Date of Patent: Mar. 4, 2014

(54) METHODS AND SYSTEMS FOR DISPLAYING, ON A FIRST MACHINE, DATA ASSOCIATED WITH A DRIVE OF A SECOND MACHINE, WITHOUT MAPPING THE DRIVE

(75) Inventor: Georgy Momchilov, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 597 days.

(21) Appl. No.: 12/964,477

(22) Filed: Dec. 9, 2010

(65) Prior Publication Data

US 2011/0137974 A1   Jun. 9, 2011

Related U.S. Application Data

(60) Provisional application No. 61/285,016, filed on Dec. 9, 2009.

(51) Int. Cl.
*G06F 15/16* (2006.01)
(52) U.S. Cl.
USPC ........... 709/202; 709/217; 715/734; 718/100; 719/313
(58) Field of Classification Search
USPC .................. 709/202, 217; 715/734; 718/100; 719/313
See application file for complete search history.

(56) References Cited

U.S. PATENT DOCUMENTS

| | | | |
|---|---|---|---|
| 5,812,129 A * | 9/1998 | Kacor et al. ................ | 715/810 |
| 6,094,684 A * | 7/2000 | Pallmann .................... | 709/227 |
| 8,341,208 B2 * | 12/2012 | Mazzaferri .................. | 709/202 |
| 2003/0197733 A1 | 10/2003 | Beauchamp et al. | |
| 2005/0071319 A1 | 3/2005 | Kelley et al. | |
| 2006/0095781 A1 * | 5/2006 | Liu ............................. | 713/183 |
| 2007/0192538 A1 * | 8/2007 | Dawkins ..................... | 711/114 |
| 2007/0233842 A1 * | 10/2007 | Roberts et al. .............. | 709/223 |
| 2007/0260702 A1 | 11/2007 | Richardson et al. | |
| 2007/0299932 A1 * | 12/2007 | Kulkarni ..................... | 709/217 |
| 2008/0177828 A1 * | 7/2008 | Accarie et al. .............. | 709/203 |
| 2009/0007139 A1 * | 1/2009 | Jacobson et al. ............ | 719/313 |
| 2009/0222411 A1 * | 9/2009 | Marcucci et al. ............ | 707/3 |
| 2009/0254843 A1 | 10/2009 | Van Wie et al. | |

OTHER PUBLICATIONS

First Chinese Office Action on 201080055182.2 dated Dec. 5, 2012.
International Preliminary Report on Patentability PCT/US2010/059720 dated Jun. 21, 2012.
International Search Report on PCT/US2010/059720 dated Aug. 2, 2011.
Written Opinion on PCT/US2010/059720 dated Aug. 2, 2011.

* cited by examiner

*Primary Examiner* — Oleg Survillo
(74) *Attorney, Agent, or Firm* — Foley and Lardner LLP; John D. Lanza

(57) ABSTRACT

Methods and systems for displaying data associated with a client drive of a client computing device in a virtualized desktop executing on a remote computing device without explicitly mapping the client drive onto the remote computing device are described. A first client agent executing on a client computing device establishes a user session with a remote computing device. The first client agent transmits data identifying the client drive of the client computing device to a second client agent executing on the remote computing device. The second client agent receives data associated with the client drive and generates a shell link using the received data associated with the client drive in the context of the user session. The second client agent displays the data associated with the client drive of the client computing device in a virtualized desktop executing on the remote computing device.

16 Claims, 11 Drawing Sheets

Confirmation that Drive 128b
has not been mapped as a
drive local to the Remote
Machine 106

```
Administrator: C:\Windows\system32\cmd.exe                          _ □ ×

Microsoft Windows [Version 6.1.7600]
Copyright (c) 2009 Microsoft Corporation.  All rights reserved.

C:\Users\Administrator>net use
New connection will be remembered.

Status       Local      Remote              Network
-------------------------------------------------------------------
                        \\Client\A$         Citrix Client Network
                        \\Client\C$         Citrix Client Network
                        \\Client\D$         Citrix Client Network
                        \\Client\Z$         Citrix Client Network
The command completed successfully.
C:\Users\Administrator> _
```

Enumeration of Drives
Available to User of
Client Machine 102

Fig. 6

METHODS AND SYSTEMS FOR DISPLAYING, ON A FIRST MACHINE, DATA ASSOCIATED WITH A DRIVE OF A SECOND MACHINE, WITHOUT MAPPING THE DRIVE

CROSS-REFERENCE TO RELATED APPLICATIONS

This application claims priority to U.S. Application Ser. No. 61/285,016, entitled "Methods and Systems for Displaying, on a First Machine, Data Associated with a Drive of a Second Machine, Without Mapping the Drive," filed Dec. 9, 2009, the entire disclosure of which is incorporated herein by reference in its entirety for any and all purposes.

TECHNICAL FIELD

The present disclosure relates to methods and systems for displaying data identifying characteristics of network drives. In particular, the present disclosure relates to methods and systems for displaying, on a remote computing device, data associated with a drive of a client computing device, without mapping the drive.

BACKGROUND

In conventional environments for integrating a display of remotely generated desktop environments with listings of locally provided storage devices, data identifying characteristics of the locally provided storage devices is not incorporated into the remotely generated desktop environments. For example, some conventional systems may map a network drive as a local volume, but will not typically make data identifying characteristics of the mapped network drive available to the user of the desktop environment. In other conventional systems, Uniform Naming Convention (UNC) Links to storage devices are provided. However, these types of systems do not conventionally allow for the display of the data identifying characteristics of the storage device, such as type (name/label, icon, device category), disk size, or available space. These systems may present an inconvenient and potentially counter-intuitive end-user experience, especially if there are a variety of storage devices available (e.g. USB drives, CD-ROM drives, hard disk drives, floppy drives, network-mapped drives, shares, combinations of server drives and remote client drives, etc.).

FIG. 1A depicts a screen shot of a prior art system in which data identifying characteristics of a drive provided by a machine are not provided and in which a drive of the client computing device is mapped as a local drive on the remote computing device. In this example, no volume names or customized icons or drive-type icons are displayed. Such an environment may result in an inconvenient and potentially counter-intuitive end user experience.

SUMMARY

In its broadest interpretation, this disclosure describes methods and systems for enumerating client drives of a client computing device in a virtualized desktop executing on a remote computing device without explicitly mapping the client drive on the remote computing device. The present invention provides a user the ability to use a client computing device to access client drives on the client computing device through a virtualized desktop on a remote computing device. This approach allows users to access and view drive information (such as type of drive, availability of space on the drive, capacity of the drive) without explicitly mapping the drive to the remote computing device.

The present application is directed towards methods and systems for displaying on a remote computing device, data associated with a drive of a client computing device without mapping the drive to the remote computing device.

In one aspect, the present invention is related to displaying, in a virtualized desktop executing on a remote computing device, data associated with a client drive of a client computing device, without explicitly mapping the client drive onto the remote computing device. A first client agent executing on a client computing device establishes a user session with a remote computing device. The first client agent transmits data identifying a client drive of the client computing device to a second client agent executing on the remote computing device. The second client agent receives data associated with the client drive of the client computing device. The second client agent generates a shell link using the received data associated with the client drive of the client computing device in the context of the user session. A shell link may comprise a data object that contains information used to access the client drive of the client computing device. The second client agent displays the data associated with the client drive of the client computing device in a virtualized desktop executing on the remote computing device.

In one embodiment, the client drive further comprises a Universal Serial Bus (USB) flash drive. In a further embodiment, the second client agent intercepts device notifications for the USB flash drive generated by the client computing device and modifies the USB flash drive shell link responsive to the intercepted device notifications. In one embodiment, the data associated with the client drive of the client computing device further comprises disk space data for the client drive. In one embodiment, the data associated with the client drive of the client computing device further comprises graphical data representative of the client drive. In one embodiment, the data associated with the client drive of the client computing device further comprises a user-assigned alphanumeric string forming a volume name of the client drive. In one embodiment, the second client agent generates an identifier for the shell link. In a further embodiment, the second client agent registers the identifier for the shell link in a registry provided by an operating system executing on the remote computing device. In one embodiment, the second agent suppresses display of the client drive responsive to a security policy. In one embodiment, the remote computing device displays the data associated with the client drive of the client computing device as a cursor hovers over the client drive displayed on the remote computing device.

In another aspect, the present invention is related to a system for displaying, in a virtualized desktop executing on a remote computing device, data associated with a client drive of a client computing device, without explicitly mapping the client drive onto the remote computing device. The system include a client computing device and a remote computing device. The client computing device includes a first client agent establishing a user session with a remote computing device and transmitting data identifying a client drive of the client computing device to a second client agent executing on the remote computing device. The remote computing device includes a second client agent receiving data associated with the client drive of the client computing device, generating a shell link using the received data associated with the client drive of the client computing device in the context of the user session and displaying the data associated with the client drive of the client computing device in a virtualized desktop executing on the remote computing device. A shell link may include a data object that contains information used to access the client drive of the client computing device.

In one embodiment, the client drive further comprises a Universal Serial Bus (USB) flash drive. In a further embodiment, the second agent intercepts device notifications for the USB flash drive generated by the client computing device and modifies the USB flash drive shell link responsive to the intercepted device notifications. In one embodiment, the data associated with the client drive of the client computing device further comprises disk space data for the client drive. In one embodiment, the data associated with the client drive of the client computing device further comprises graphical data representative of the client drive. In one embodiment, the data associated with the client drive of the client computing device further comprises a user-assigned alphanumeric string forming a volume name of the client drive. In one embodiment, the second client agent generates an identifier for the shell link. In a further embodiment, the second client agent registers the identifier for the shell link in a registry provided by an operating system executing on the remote computing device. In one embodiment, the second agent suppresses display of the client drive responsive to a security policy. In one embodiment, the remote computing device displays the data associated with the client drive of the client computing device as a cursor hovers over the client drive displayed on the remote computing device.

The details of various embodiments of the invention are set forth in the accompanying drawings and description below.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIG. 6 is another screen shot depicting an embodiment of a system in which data identifying a characteristic of a drive of a client computing device in a networked computing environment is depicted in an enumeration of drives on the remote computing device without mapping the drive on the remote computing device.

DETAILED DESCRIPTION

Figure 1A:
FIG. 1A is a screen shot depicting an embodiment of a system in which data identifying a characteristic of a drive of a client computing device in a networked computing environment is not depicted in an enumeration of drives on the remote computing device and in which a drive of the client computing device is mapped as a local drive on the remote computing device.
Figure 1B:
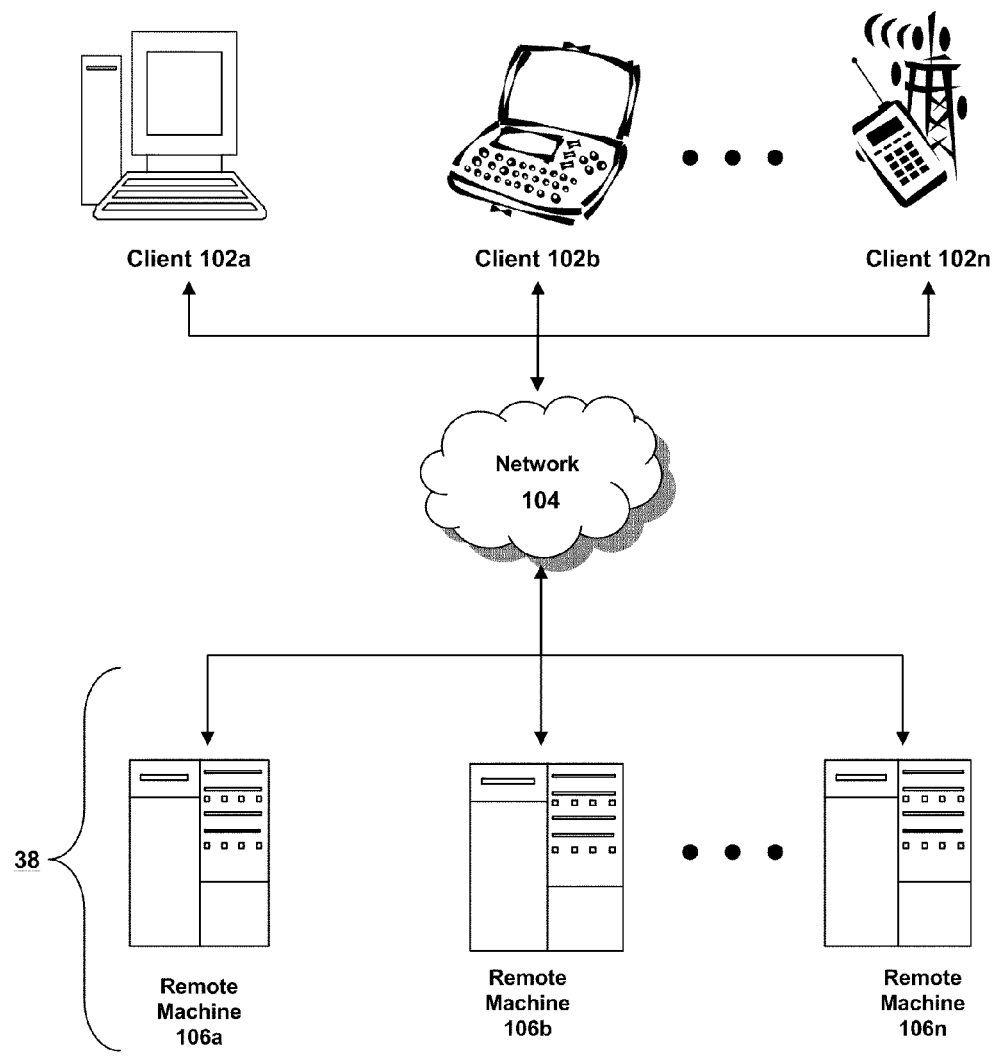
FIG. 1B is a block diagram depicting an embodiment of a network environment comprising local machines in communication with remote machines.

Referring now to FIG. 1B, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1B shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm. In another of these embodiments, the remote machines 106 may be geographically dispersed. In other embodiments, a server farm may be administered as a single entity. In still other embodiments, the server farm comprises a plurality of server farms. The remote machines 106 within each server farm can be heterogeneous—one or more of the remote machines 106 can operate according to one type of operating system platform (e.g., WINDOWS NT, WINDOWS 2003, WINDOWS 2008, WINDOWS 7, or WINDOWS Server 2008R2, all of which are manufactured by Microsoft Corp. of Redmond, Wash.), while one or more of the other remote machines 106 can operate on according to another type of operating system platform (e.g., Unix or Linux).

The remote machines 106 of each server farm do not need to be physically proximate to another remote machine 106 in the same server farm. Thus, the group of remote machines 106 logically grouped as a server farm may be interconnected using a wide-area network (WAN) connection or a metropolitan-area network (MAN) connection. For example, a server farm may include remote machines 106 physically located in different continents or different regions of a continent, country, state, city, campus, or room. Data transmission speeds between remote machines 106 in the server farm can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm. In another embodiment, the local machine 102 executes a program neighborhood application to communicate with a remote machine 106 in a server farm. In still another embodiment, the remote machine 106 provides the functionality of a master node. In some embodiments, the local machine 102 communicates with the remote machine 106 in the server farm through a network 104. Over the network 104, the local machine 102 can, for example, request execution of various applications hosted by the remote machines 106a-106n in the server farm and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm may be running one or more applications, such as an application providing a thin-client computing or remote display presentation application. In one embodiment, the remote machine 106 or server farm executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1C:
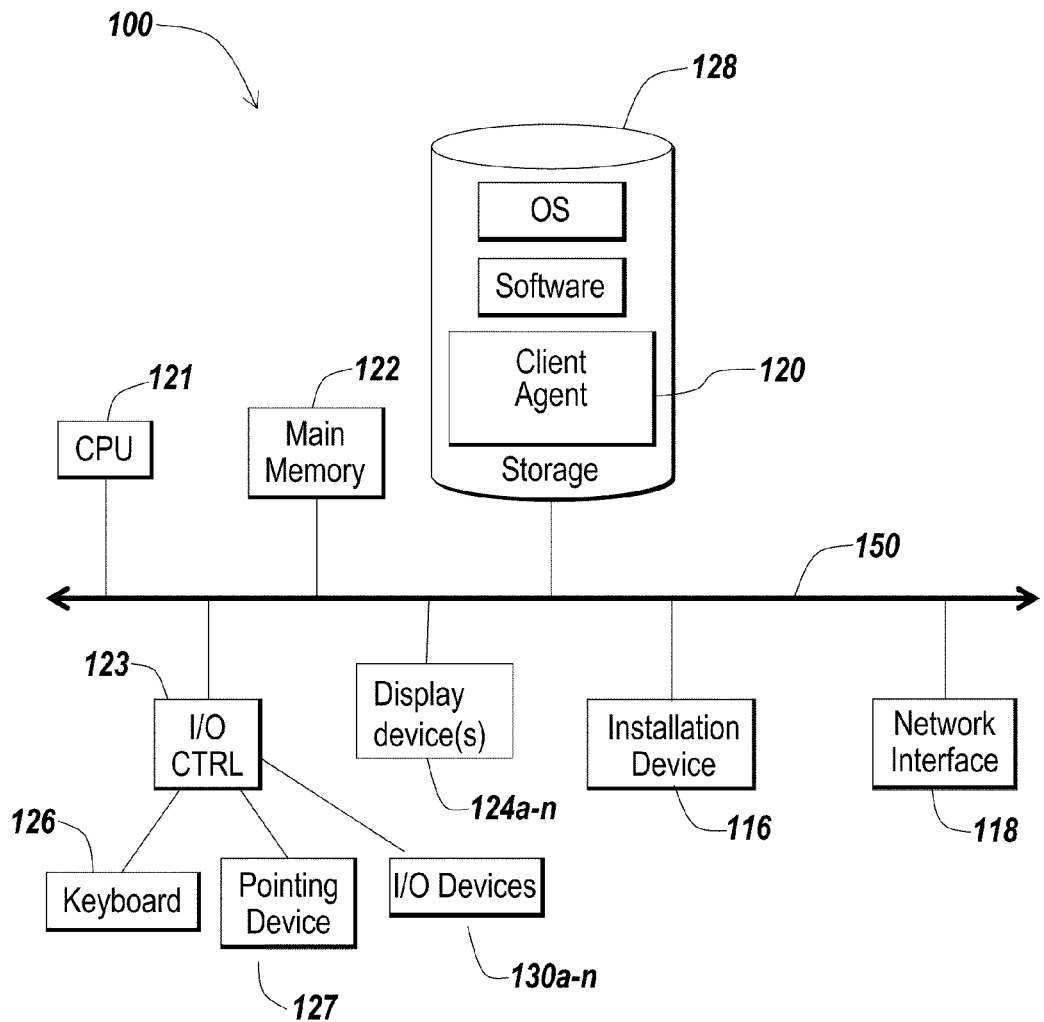
FIGS. 1C-1F are block diagrams depicting embodiments of computers useful in connection with the methods and systems described herein.
Figure 1D:
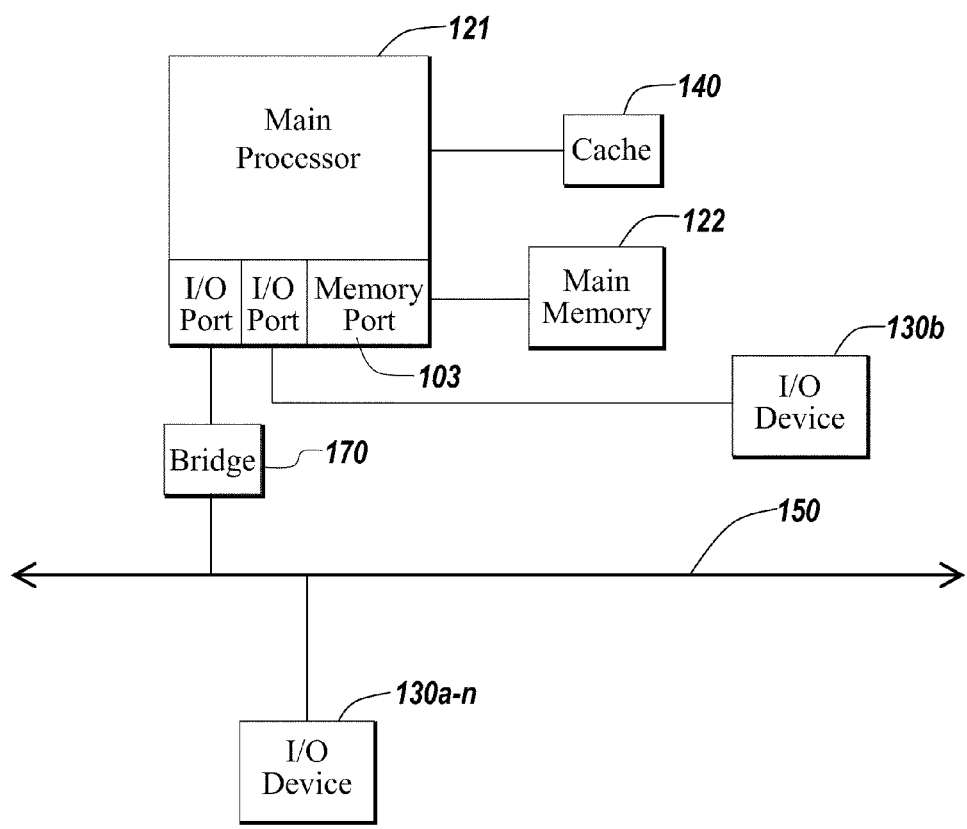

The local machine 102 and remote machine 106 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the local machine 102 or a remote machine 106. As shown in FIGS. 1C and 1D each computing device 100 includes a central processing unit 121, and a main memory unit 122. As shown in FIG. 1C, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1D, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1D depicts an embodiment of a computer 100 in which the main processor 121 communicates directly with I/O device 130b via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown)

to receive handheld USB storage devices such as the USB Flash Drive line of devices manufactured by Twintech Industry, Inc. of Los Alamitos, Calif.

Referring again to FIG. 1C, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1C and 1D typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102*a* may request resources from a remote machine 106, while providing the functionality of a remote machine 106 to a client 102*b*. In such an embodiment, the computing device 102*a* may be referred to as a client with respect to data received from the remote machine 106 (which may be referred to as a server) and the computing device 102*a* may be referred to as a server with respect to the second client 102*b*. In another embodiment, the client 102 may request resources from the remote machine 106 on behalf of a user of the client 102.

Figure 1E:
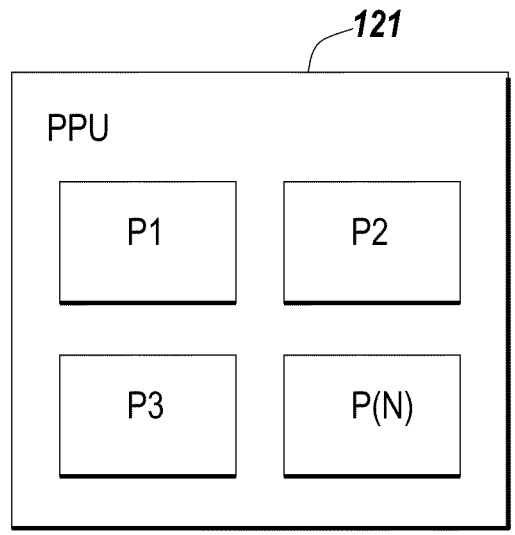

As shown in FIG. 1E, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory that is shared and some memory that can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1F:
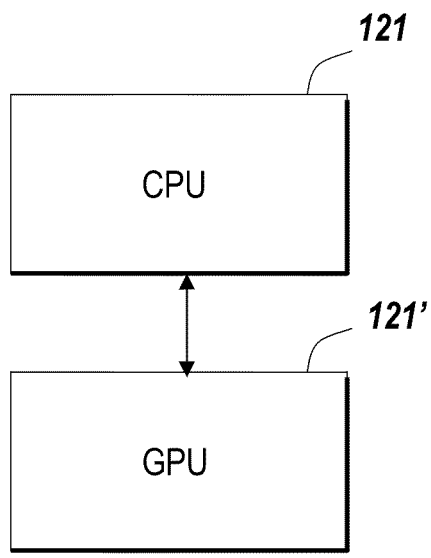

In some embodiments, the computing device 100 may comprise a graphics processing unit. In one of these embodiments, depicted in FIG. 1F, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106*b* and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102b.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106b) and displayed in the remote desktop environment. However, there may be resources made available to the user by the local computing device 102. For example, the local computing device 102 may provide access to a local disk drive, a drive available over a network 104, a removable storage device (e.g., floppy disks, CD/DVDs, removable disks (such as USB drive), etc.), or other device 128 and the user may wish to access that device 128 to store or retrieve data for use in conjunction with a resource executed on behalf of the user by the remote computing device 106. In another of these embodiments, a user may make requests for retrieving data from or storing data on a device 128 by interacting with the remote desktop environment generated by the remote computing device 106.

Figure 2:
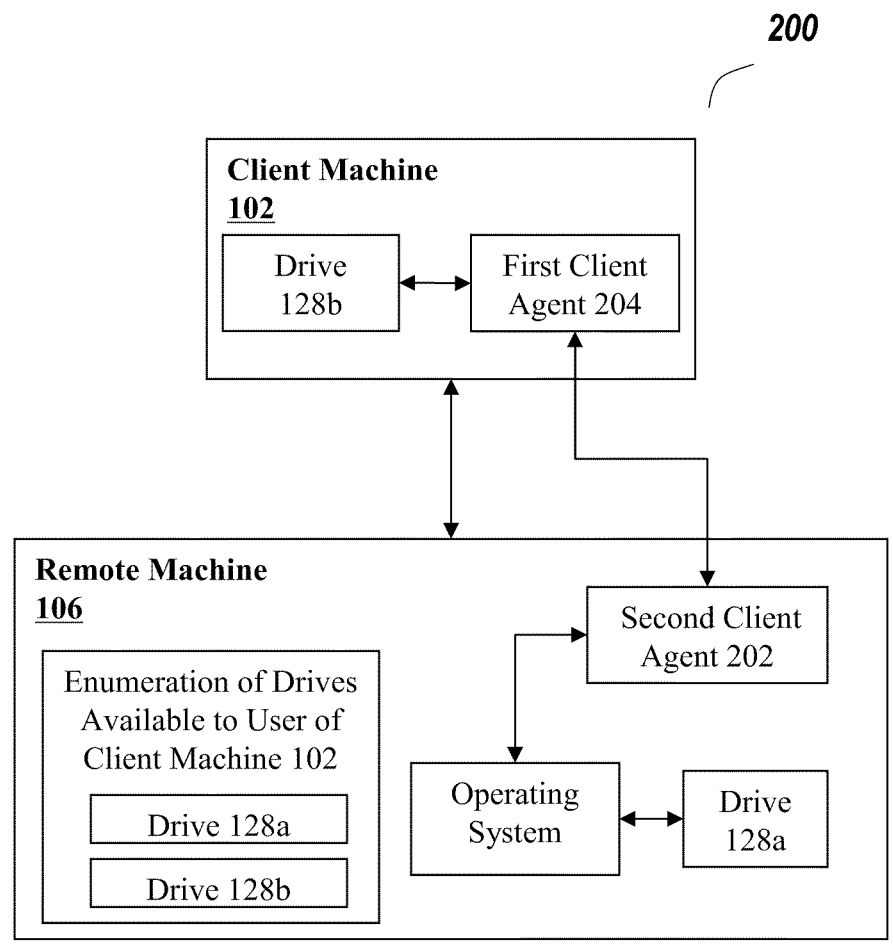
FIG. 2 is a block diagram depicting one embodiment of a system for displaying, on a remote computing device in a networked computing environment, data associated with a drive of a client computing device in the networked computing environment, without mapping the drive on the remote computing device.

Referring now to FIG. 2, a block diagram depicts one embodiment of a system 200 for displaying, on a remote computing device 106 in a networked computing environment, data associated with a drive 128b of a client computing device 102 in the networked computing environment, without mapping the drive 128b on the remote computing device 106. In brief overview, the system 200 includes a second client agent 202 executing on a remote computing device 106 and a first client agent 204 executing on a client computing device 102. The second client agent 202 receives data identifying a characteristic of a drive 128b provided by the client computing device 102. The second client agent 202 intercepts a request by an operating system executing on the remote computing device 106 for an enumeration of drives 128 provided by the remote computing device 106. The second client agent 202 directs a display of the received data provided by the client computing device 102 in the enumeration of drives provided by the remote computing device, without mapping the drive, responsive to the intercepted request. In some embodiments, data identifying a characteristic of a drive may include, without limitation, a user-designated name or label (including, without limitation user-designated drive label—Local Disk, CD/DVD Drive, Network Drive—and user-designated drive letter—C, D, E, etc.), a type of the drive (hard drive, removable device, CD-ROM, DVD, floppy drive, network-mapped drive, client share, etc.), device category, graphical data representing the drive in a desktop environment (e.g., an icon), and a size of the disk (including, for example, total size of the disk and size of available space on the disk). In one of these embodiments, a type of a drive is indicated via a drive label.

Referring still to FIG. 2, and in greater detail, the second client agent 202 executes on the remote computing device 106. In one embodiment, the remote computing device 106 is a computing device as described above in connection with FIG. 1B-1F. In some embodiments, the second client agent 202 includes a receiver for receiving, from the first client agent 204 executing on the client computing device 102, data identifying a characteristic of a drive 128b provided by the client computing device 102. In one of these embodiments, for example, the second client agent 202 includes a receiver provided as a dynamically linked library. In still another of these embodiments, the second client agent 202 includes a receiver provided as a network redirector file system driver. In still even another of these embodiments, the second client agent 202 is a presentation layer protocol agent communicating with the first client agent 204 according to a presentation layer protocol; for example, the second client agent 202 and the first client agent 204 may communicate according to any of the presentation layer protocols described above in connection with FIG. 1B. In other embodiments, the second client agent 202 is referred to as a network provider component and performs drive enumeration, mapping and unmapping of drives, and creation and removal of shell links identifying a drive 128b without the use of mapping.

In some embodiments, the second client agent 202 is in communication with a shell executing on the remote computing device 106. The shell is software providing a user interface to the user of a computing device. In one embodiment, a shell may be supplemented or replaced with a third-party shell. In MICROSOFT WINDOWS, the default shell is EXPLORER, which determines the configuration of the desktop (e.g., the task bar, notification area, start menu, etc.).

In some embodiments, the first client agent 204 executes on the local computing device 102. In one embodiment, the local computing device 102 is a computing device as described above in connection with FIG. 1B-1F. In another embodiment, the first client agent 204 is part of a presentation layer protocol agent executing on the local computing device 102. In still another embodiment, the first client agent 204 is in communication with a presentation layer protocol agent.

In some embodiments, the first client agent 204 is in communication with a shell executing on the client computing device 102. The shell is software providing a user interface to the user of a computing device. In one embodiment, a shell may be supplemented or replaced with a third-party shell. In MICROSOFT WINDOWS, the default shell is EXPLORER, which determines the configuration of the desktop (e.g., the task bar, notification area, start menu, etc.).

In some embodiments, a drive 128 is a storage device 128 as described above in connection with FIGS. 1B-1D. In other embodiments, a drive 128 is a removable storage device, such as a USB drive. In still other embodiments, a drive 128 is a media device such as a disk drive or tape drive. In further embodiments, and by way of example, the drive 128 may be a storage device in a storage area network.

In some embodiments, the drive 128 is a component external to a machine 100. In one of these embodiments, the drive 128 is a machine 100b, such as a network-accessible drive. In other embodiments, the drive 128 is a flash memory data storage device. In further embodiments, the drive 128 is connected to a machine 100 either physically (including both external devices connected to the machine 100 and internal devices embedded into the machine 100) or wirelessly.

In some embodiments, the drive 128 is a client share. In one of these embodiments, the client share acts as a shortcut to a drive 128c on a third machine 100. In another of these embodiments, the client share acts as a security label. In still another of these embodiments, there are multiple client shares assigned different levels of permissions. In yet another of these embodiments, some users of the machine 100 are permitted to access the client share while others are not. In another of these embodiments, the drive 128 includes client directories and subdirectories, local client shares, and other shares accessible to the client. In still another of these embodiments, the system includes a user interface allowing an administrator to control what types of shares, subdirectories, or other drives 128 are to be considered when generating, by the remote computing device 106, a display of data associated with a drive 128b of a client computing device 102.

Figure 3A:
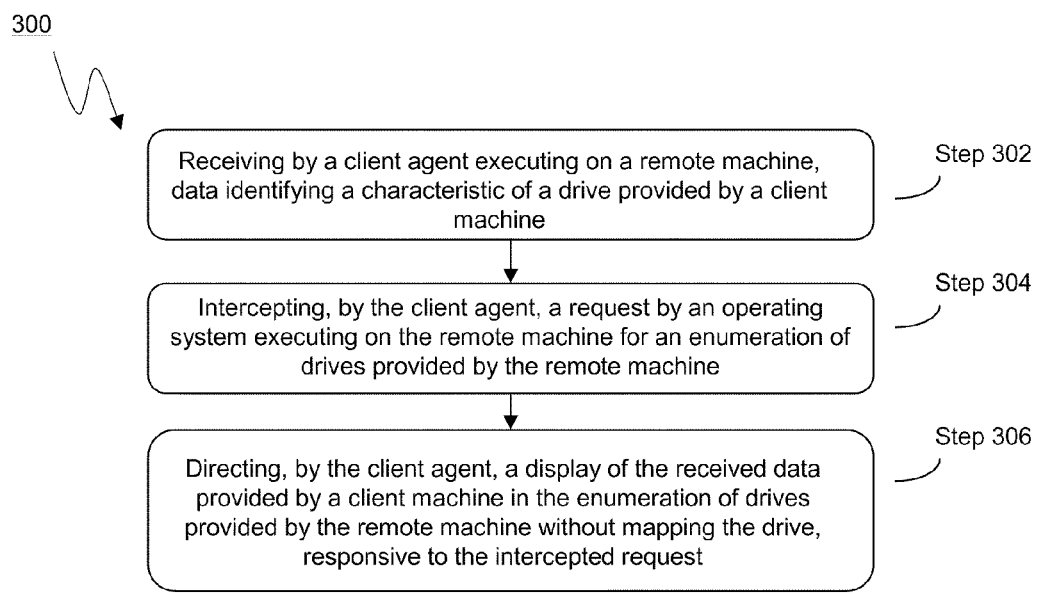
FIG. 3A is a flow diagram depicting one embodiment of a method for displaying, on a remote computing device in a networked computing environment, data associated with a client drive of a client computing device in the networked computing environment, without mapping the drive on the remote computing device.

Referring now to FIG. 3A, a flow diagram depicts one embodiment of a method for displaying, on a remote computing device in a networked computing environment, data associated with a drive of a client computing device in the networked computing environment, without mapping the drive on the remote computing device. In brief overview, the method 300 includes receiving, by a second client agent 202 executing on a remote computing device, data identifying a characteristic of a drive provided by a client computing device (302). The method includes intercepting, by the second client agent, a request by an operating system executing on the remote computing device for an enumeration of drives provided by the remote computing device (304). The method includes directing, by the second client agent 202, a display of the received data provided by the client computing device in the enumeration of drives provided by the remote computing device, without mapping the drive, responsive to the intercepted request (306).

Referring still to FIG. 3A, and in greater detail, a second client agent 202 executing on a remote computing device receives data identifying a characteristic of a drive provided by a client computing device (302). In one embodiment, the second client agent 202 receives the data from the first client agent 204, which executes on the client computing device 102. In another embodiment, the second client agent 202 receives the data across a virtual channel established between the second client agent 202 and the first client agent 204, as part of a communication session established according to a presentation layer protocol.

In some embodiments, the second client agent 202 transmits a request for the data to the first client agent 204. In one of these embodiments, the second client agent 202 initiates a data retrieval request (for example, when the second client agent 202 receives an indication that a new device 128b has connected to the client computing device 102 or when the second client agent 202 receives an indication that a user has logged in to the client computing device 102). In other embodiments, the first client agent 204 transmits the data to the second client agent 202 without first receiving a request for the transmission. In one embodiment, the first client agent 204 collects the requested data and transmits the collected data to the second client agent 202. In another embodiment, the first client agent 204 accesses an application programming interface (API) to retrieve the data. For example, and without limitation, the first client agent 204 may retrieve the data by using an API such as "GetLogicalDrives", "GetDriveType", "DeviceIoControl", "GetVolumeInformation", "GetVolumeInformationByHandle," or "GetDiskFreeSpace". In still another embodiment, the first client agent 204 may retrieve the data for a device 128b at a time when the device 128b is first connected to the client computing device 102 (e.g., in "Plug-and-Play" scenarios); in such an embodiment, the first client agent 204 may use an API (such as, by way of example, a RegisterDeviceNotification API) to receive notifications regarding the arrival or removal of the device 128b from a component of the operating system executing on the client computing device 102 (e.g., an OS Plug-and-Play Manager). In still another embodiment, and without limitation, the first client agent 204 may generate a command according to a MICROSOFT WINDOWS API (such as, for example and without limitation, GetSystemMetrics, WTSQuerySessionInformation, GetCurrentProcessId, or ProcessIdToSessionId), transmit the command to an operating system executing on the client computing device 102, and transmit a response received from the operating system to the second client agent 202.

In some embodiments, when retrieving data for a UNC-mapped drive 128b, the first client agent 204 accesses a registry provided by an operating system executing on the client computing device 102. In one of these embodiments, the first client agent 204 identifies, within the registry, a shell link that identifies a remote drive in the context of the current user's session (e.g., HKEY_CURRENT_USER\Software\Microsoft\Windows\CurrentVersion\Explorer\SessionInfo\<SessionID>\MyComputer\Namespace\<GUID>, where Session ID identifies the user/Terminal Services session, and GUID is a unique identifier for the shell link); the first client agent 204 may then retrieve additional detail associated with the identified shell link and identifying a name or label for the drive 128b (e.g., by accessing a registry key such as HKEY_CLASSES_ROOT\CLSID\<GUID> and retrieving a key value identifying the mapped drive from the key or a sub-key). In another of these embodiments, one or more registry keys associated with the GUID identify additional data such as total disk size, available disk space, default icons, etc. In other embodiments, the first client agent 204 uses an API to retrieve a listing of one or more drives 128b provided by the client computing device 102; for example, the first client agent 204 may access a WNetEnumResource API or WNetGetConnection API.

In some embodiments, the first client agent 204 transmits graphical data representative of the drive 128b (e.g., an icon) to the second client agent 202. In other embodiments, the second client agent 202 directs the generation of graphical data representing the drive 128b, responsive to the identification of a drive type received from the first client agent 204.

The second client agent intercepts a request by an operating system executing on the remote computing device for an enumeration of drives provided by the remote computing device (304). In some embodiments, the second client agent 202 intercepts a request by the operating system for a display of a characteristic of one of the enumerated drives. In one of these embodiments, the second client agent 202 intercepts enumeration, mapping, and I/O redirection requests.

In some embodiments, the second client agent 202 receives, from the first client agent 204, an indication that a user of the client computing device 102 has generated a request for data identifying a characteristic of an enumerated drive. In one of these embodiments, by way of example, a user may have interacted with a local display of a remotely-generated desktop environment to request an enumeration of drives 128 provided by the remote computing device 106 and provided by the client computing device 102, or to request a characteristic—such as name, type, or drive size—of the drive 128. In another of these embodiments, the second client agent 202 transmits the indication to the operating system for processing. In still another of these embodiments, the operating system generates a command for retrieving the requested data from the remote computing device 106 (for example, a query for a drive size of a drive 128a). In yet another of these embodiments, the second client agent 202 intercepts the generated command and determines that a response to the command should include data identifying a characteristic of the drive 128b provided by the client computing device 102.

The second client agent 202 directs a display of the received data provided by the client computing device in the enumeration of drives provided by the remote computing device, without mapping the drive, responsive to the intercepted request (306). In one embodiment, the second client agent 202 makes a determination to display the received data without mapping the identified drive 128b. In another embodiment, the second client agent 202 associates at least one registry entry (e.g., a Shell Link) with the received data, the registry entry stored within an operating system environment dedicated to a session with the client computing device 102. In still another embodiment, the associated registry entry represents the drive 128b. In still even another embodiment, the shell on the remote computing device 106 (such as, WINDOWS Explorer), acting as the default Shell and on behalf of the user, reads these links and presents them in a user interface element enumerating drives 128a, b, available to a user of the client computing device 102.

In one embodiment, a user of a client computing device 102 generates a request for data identifying disk size of a drive 128 by using a pointing device (e.g., a mouse) to hover a cursor over an icon shown in a local display of a remotely generated desktop environment and representing the drive 128; the first client agent 204 intercepts the generated request and transmits the intercepted request to the second client agent 202, which forwards the intercepted request to the operating system executing on the remote computing device 106 for processing; as part of the processing of the intercepted request, the second client agent 202 may communicate with the operating system to direct the display of data identifying a characteristic of a drive 128b provided by a client computing device 102. In another embodiment, the second client agent 202 directs a display of data identifying a total amount of space provided by the drive 128b. In still another embodiment, the second client agent 202 directs a display of data identifying an amount of space available on the drive 128b.

In one embodiment, the second client agent 202 directs the display of data identifying a user-assigned alphanumeric string forming a volume name of the drive 128b. In another embodiment, by way of example, an end user of the client computing device 102 has assigned a volume name—as opposed to a drive letter—and uses the assigned volume name to distinguish the drive 128b from other drives (such as a drive 128a provided by the remote computing device 102 or other drives 128); the second client agent 202 then directs the display of the volume name in a format such as "[Drive Letter on Client computing device]: on [Name of Client computing device]", (e.g., "C on MachineName"), in enumerations of drives 128 provided by both the remote computing device 106 and the client computing device 102.

In some embodiments, the second client agent 202 receives, from the first client agent 204, a drive letter for a drive 128b provided by the machine 102 and a machine name for the machine 102. In one of these embodiments, the second client agent 202 generates a symbolic link such as a UNC link in the format of \\MachineName\DriveLetter. In another of these embodiments, the second client agent 202 generates a symbolic link such as a UNC link in the format of \\Client\DriveLetter. In another of these embodiments, the second client agent 202 directs the display of the UNC link in the remotely generated desktop environment, rather than directing the operating system to mount the drive 128b provided by the client computing device 102. In still another of these embodiments, the second client agent 202 directs the display of the UNC link in the remotely generated desktop environment in addition to directing the operating system to mount the drive 128b provided by the client computing device 102.

In one embodiment, the second client agent 202 receives, with the data identifying the characteristic of the drive 128b, graphical data representative of the drive 128b; for example, the second client agent 202 may receive an icon representing the drive 128b. In another embodiment, the second client agent 202 directs the display of the received icon in the enumeration of drives 128 provided by both the remote computing device 106 and the client computing device 102. In still another embodiment, the second client agent 202 directs the display of different icons for different types of drives 128. For example, the second client agent 202 may receive a first icon representative of a drive 128b provided by the client computing device 102 and a second icon representative of a second drive 128b provided by the client computing device 102; a user may use a display of different icons for different drives to determine a type of the drive (e.g., USB, CD-ROM, hard drive, etc.). In other embodiments, the second client agent 202 receives, from the first client agent 204, an identification of a type of drive of the drive 128b and identifies graphical data stored by the remote computing device 106 for use in generating a representation of the drive 128b.

In some embodiments, the second client agent 202 intercepts the request by the operating system executing on the remote computing device 106 for the enumeration of drives provided by the remote computing device 106 and determines to prevent a display at least one drive provided by the remote computing device 106. In one of these embodiments, by way of example, the remote computing device 106 is forwarding data from the client computing device 102 to a third machine 106b; in such an embodiment, there may be security or other policy reasons for not displaying drives for machines 106 that are intermediaries between a machine generating a remote desktop environment and the machine from which an end user accesses the remote desktop environment.

In other embodiments, the second client agent 202 intercepts the request by the operating system executing on the remote computing device 106 for the enumeration of drives provided by the remote computing device 106 and determines not to display data identifying characteristics of a drive 128b provided by the client computing device 102. In one of these embodiments, by way of example, due to security or other policy reasons, a user of the client computing device 102 is prevented from accessing any hardware or software resources of the client computing device 102 and is only allowed to access resources provided by the remote computing device 106.

Figure 3B:
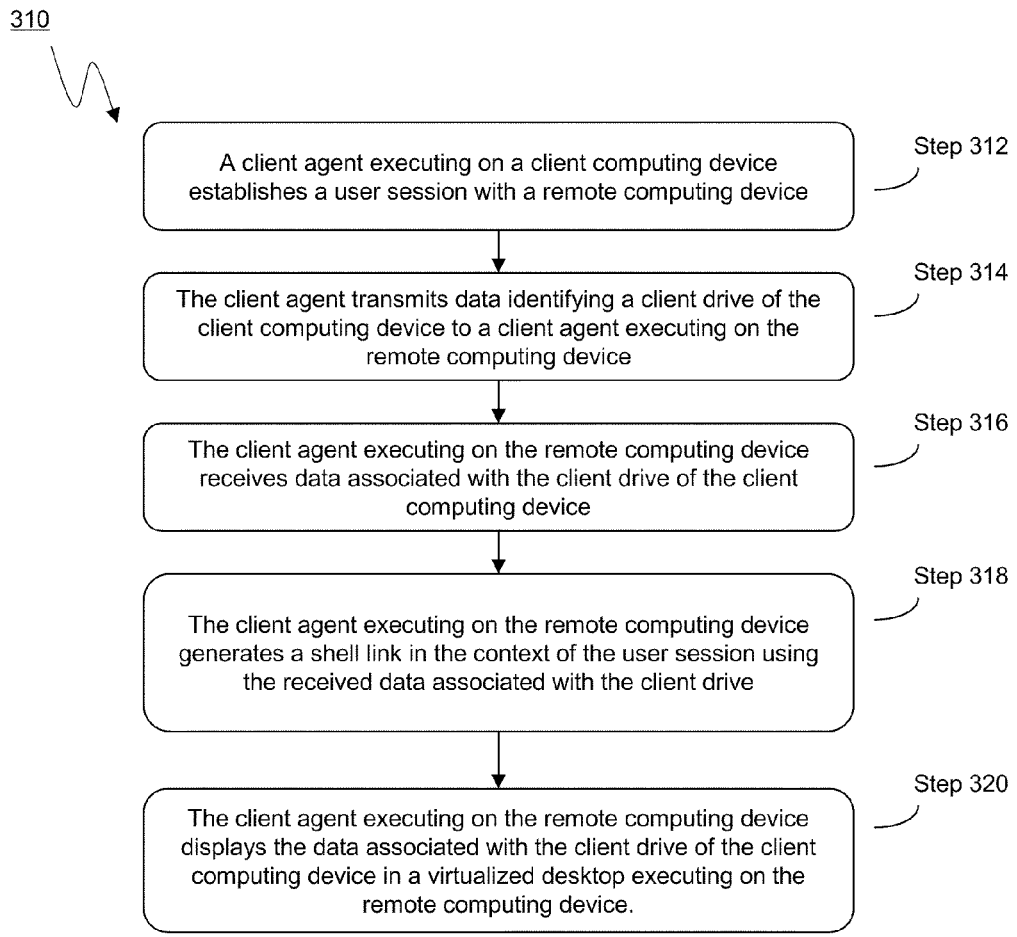
FIG. 3B is a flow diagram depicting another embodiment of a method for displaying, on a remote computing device in a networked computing environment, data associated with a client drive of a client computing device in the networked computing environment, without mapping the client drive on the remote computing device.

Referring now to FIG. 3B, a flow diagram depicts another embodiment of a method for displaying data associated with a drive 128b of a client computing device 102 in a virtualized desktop executing on a remote computing device 106 in a networked computing environment without explicitly mapping the drive 128b. In brief overview, the method 310, includes a client agent 204 executing on a client computing device 102 establishing a user session with a remote computing device 106 (step 312). At step 314, the client agent 204 transmits data identifying a client drive 128b of the client computing device 102 to a client agent 202 executing on the remote computing device 106. At step 316, the client agent 202 executing on the remote computing device 106 receives data associated with the client drive 128b of the client computing device 102. At step 318, the client agent 202 executing on the remote computing device 106 generates a shell link in the context of the user session using the received data associated with the client drive 128b. At step 320, the client agent 202 executing on the remote computing device 106 displays the data associated with the client drive 128b of the client computing device 102 in the virtualized desktop executing on the remote computing device 106.

Referring still to FIG. 3B, and in greater detail, at step 312, a client agent 204 executing on a client computing device 102 establishes a user session with a remote computing device

106. The client agent 204 may establish a user session with the remote computing device 106 using any known methods in the art or methods of connection and communication as described herein. The user has access to a virtualized desktop executing on the remote computing device 106. Different environments provided by the remote computing device 106 provide different end-user experience and security requirements, influencing availability and visibility of native desktop environment drives and remote client drives. For instance, in one environment, the client computing device 102 does not display the local client desktop at all and directly connects to a full-screen remote desktop on a virtual desktop infrastructure (VDI). In some embodiments, data stored locally may need to be accessed and can most easily be done through the features of the present disclosure in the virtualized desktop environment executing on the remote computing device 106.

At step 314, the client agent 204 transmits data identifying a client drive 128b of the client computing device 128b to a client agent 202 executing on the remote computing device 106. In some embodiments, the first client agent 204 transmits data identifying the client drive 128b upon establishing a connection with the remote computing device 106. In some embodiments, the first client agent 204 transmits data identifying all client drives 128. In other embodiments, the first client agent 204 transmits data identifying only pre-determined client drives 128 of the client computing device 102. In some embodiments, the client drives 128 are predetermined at the time of connection by the user. In other embodiments, the client drives are predetermined by an administrator. In some embodiments, the first client agent 204 transmits data identifying one or more client drives 128 to the remote computing device 106 after receiving a request from the remote computing device 106. In some embodiments, the client agent ignores, suppresses, or otherwise omits transmitting data associated with a client drive 128b responsive to a policy. In some embodiments, the omissions is for security purposes, ensuring that sensitive information stored in an identified client drive 128b is not visible to the remote computing device 106. This is especially important in the event that multiple users have access to the remote computing device 106 or otherwise share the resources utilized by the remote computing device 106.

In some embodiments, the first agent 204 transmits data identifying the client drive 128b upon identification of the client drive 128 through a device detection mechanism, such as Plug-and-Play. In some embodiments, the device detection mechanism may be implemented by means described in U.S. patent application Ser. No. 10/711,647 entitled "System and Method for Event Detection and Re-Direction Over a Network Using a Presentation Level Protocol," filed on Sep. 29, 2004, the entire disclosure of which is incorporated herein by reference in its entirety for any and all purposes. In some embodiments, where the client drive 128b is a removable drive, such as a Universal Serial Bus (USB) flash drive, the first client agent 204 communicates with the operating system of the client computing device 102 and registers to receive device notifications (e.g., device arrival and removal from the client computing device 102) and receives device change notifications which may contain information about the USB device. In some embodiments, the first client agent 204 transmits the device notifications to the second client agent 202, which generates a new shell link or removes an existing shell link in the virtualized desktop for the removable client drive 128b responsive to receiving messages from device detection mechanisms. In other embodiments, the second client agent 202 generates a new shell link or removes an existing shell link for the removable client device 128b only after receiving explicit instructions from the user.

At step 316, the client agent executing on the remote computing device 106 receives data associated with the client drive 128b of the client computing device 102. In some embodiments, the first client agent 204 transmits all data associated with the client device 102 to the second client agent 202. In some embodiments, the first client agent 204 transmits minimal data associated with the client device 102 and the second client agent uses the received data to calculate statistics and other information pertaining to the client drive 128b. In some embodiments, the first client agent 204 transmits graphical data representative of the client drive 128b. Such graphical data may include icons identifying or representing the client drive type, such as removable disk, CD-ROM, and hard-drive. In some embodiments, the data associated with the client drive may include a user-assigned alphanumeric string forming a volume name of the client drive.

At step 318, the client agent executing on the remote computing device generates a shell link in the context of the user session using the received data associated with the client drive. In some embodiments, a shell link comprises a data object that contains information used to access the client drive of the client computing device. In other embodiments a shell link is data object that contains information used to access another object in the shell's namespace. In some embodiments, the second client agent generates an identifier for the shell link and adds the identifier to the registry of the operating system of the virtualized desktop. In some embodiments, the identifier is known as a Globally Unique Identifier, or GUID. Using a GUID ensures that any shell links are uniquely identified regardless of the number of client or remote computing devices involved or included in the system. In some embodiments, the shell links are processed by the operating system of the virtualized desktop executing on the remote computing device. The Windows shell (i.e. Explorer) executing in the context of the virtualized desktop on the remote computing device displays the client drive 128b of the client computing device along with any local or network drives associated with the virtualized desktop. When a user selects a displayed shell link, the Windows shell handles the redirection to the corresponding client target drive, as the drive is explicitly not mapped in the virtualized desktop environment. When a user hovers a cursor over a displayed shell link, the Windows shell displays the data associated with the corresponding client drive on the client computing device. The information that is displayed when a cursor hovers over a displayed shell link may be determined by the user. In some embodiments, the information displayed is pre-determined, either at the time of manufacture or by an administrator of the system. In still some embodiments, different types of information may be displayed, responsive to right-clicking or time thresholds set for the shell-link.

At step 320, the client agent executing on the remote computing device displays the data associated with the client drive of the client computing device in a virtualized desktop executing on the remote computing device. In some embodiments, only the data associated with the client drive may be displayed by the remote computing device. In other embodiments, the data associated with the client drive may be displayed by the remote computing device with an indication that it is an enumerated or unmapped drive accessible to the user.

Figure 4:
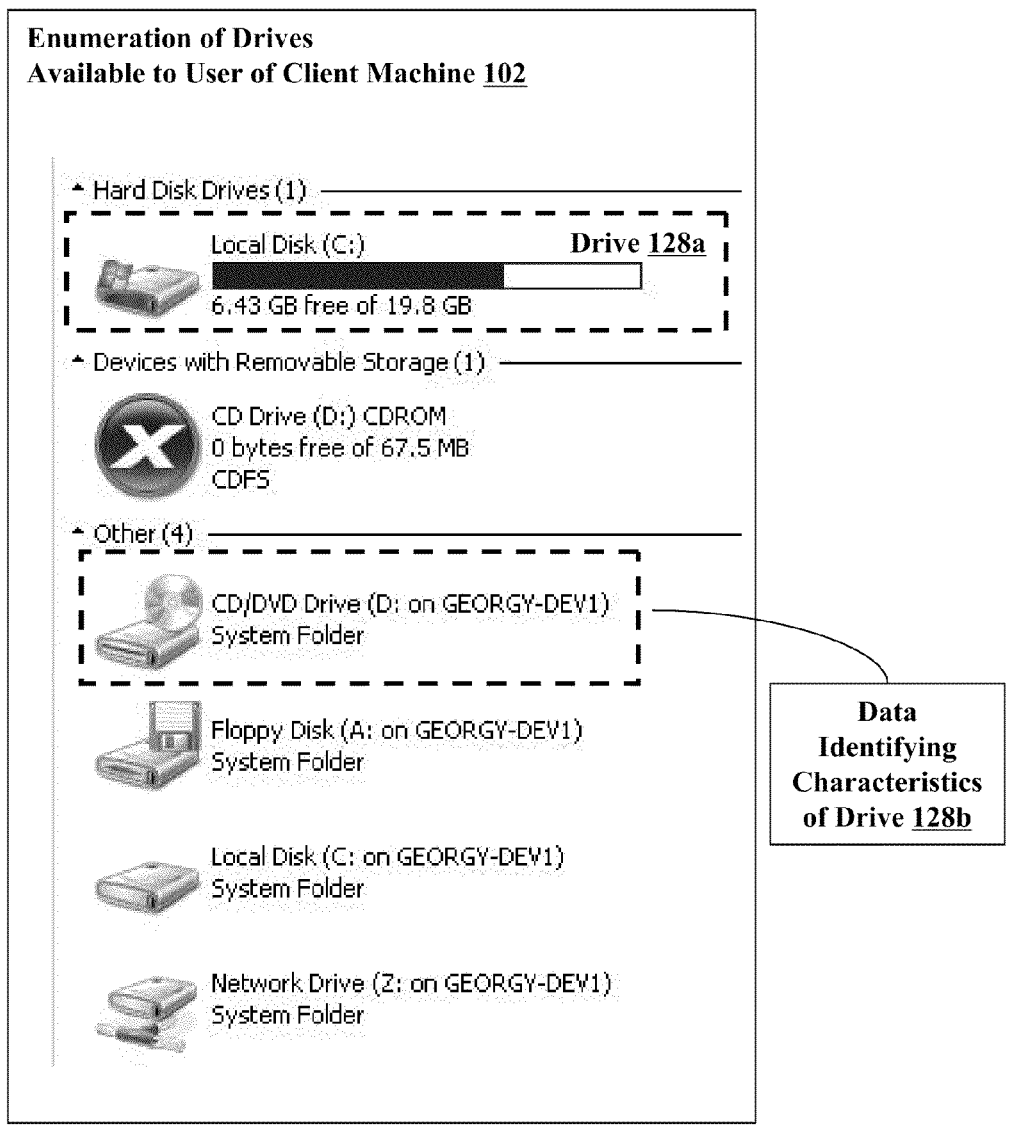
FIG. 4 is a screen shot depicting an embodiment of a system in which data identifying a characteristic of a drive of a client computing device in a networked computing environment is depicted in an enumeration of drives on the remote computing device without mapping the drive on the remote computing device.

Referring now to FIG. 4, a screen shot depicts an example of a system in which the second client agent 202 directs the display of data identifying characteristics of a drive 128b provided by a machine 102. As shown in FIG. 4, a volume name (D: on GEORGY-DEV1) is displayed with an icon representing a drive 128b. FIG. 4 also depicts an embodiment in which a type of drive (CD/DVD Drive) is listed with the graphical representation of the drive 128b.

Figure 5:
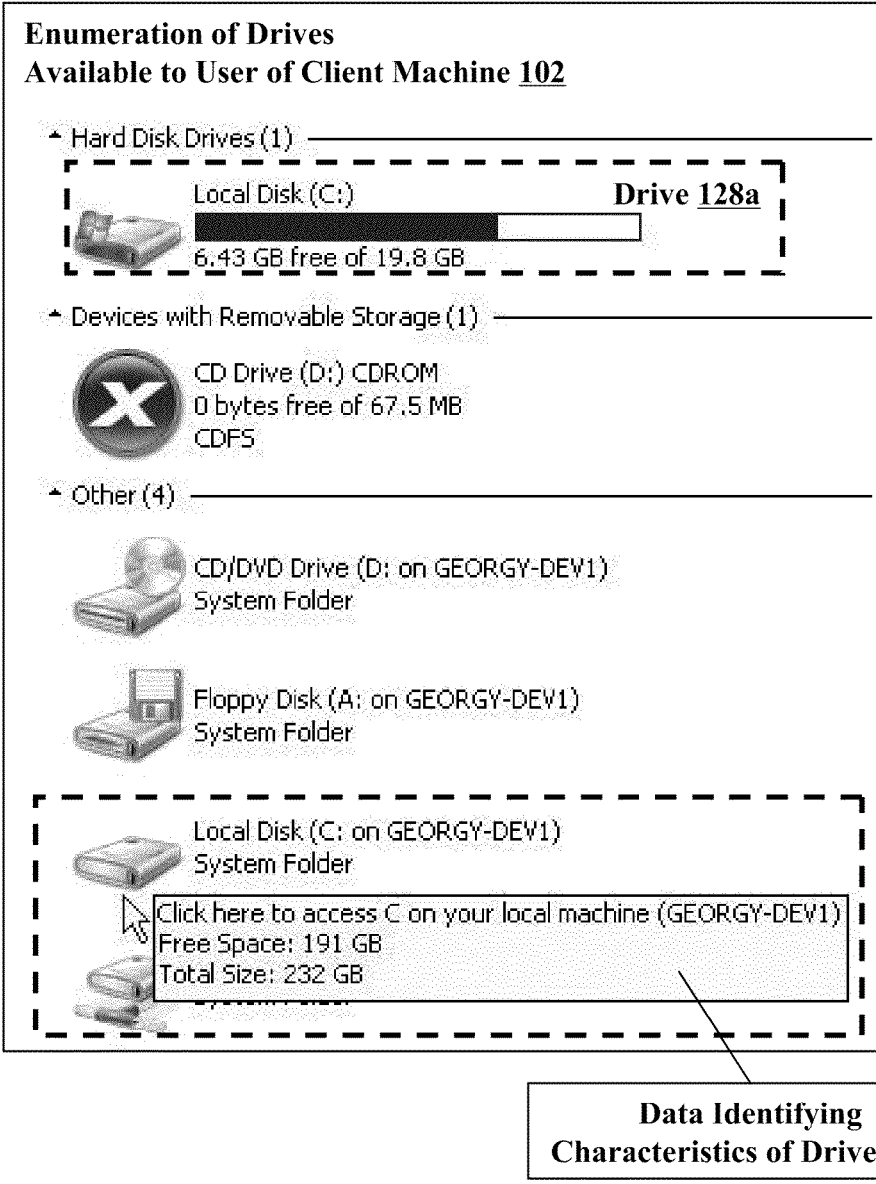
FIG. 5 is another screen shot depicting an embodiment of a system in which data identifying a characteristic of a drive of a client computing device in a networked computing environment is depicted in an enumeration of drives on the remote computing device without mapping the drive on the remote computing device.

Referring now to FIG. 5, a screen shot depicts another example of a system in which the second client agent 202 directs the display of data identifying characteristics of a drive 128b provided by a machine 102. In some embodiments, and as shown in FIG. 5, when an end user of the client computing device 102 uses a pointing device (such as a mouse) to hover a cursor over the representation of the drive 128b, additional data, such as the amount of space available on or a total disk size of the drive 128b, may be displayed.

Referring now to FIG. 6, a screen shot depicting an embodiment of a system in which data identifying a characteristic of a drive of a client computing device in a networked computing environment is depicted in an enumeration of drives on the remote computing device without mapping the drive on the remote computing device. As shown in FIG. 6, the system has not mapped the drive 128b to the remote computing device 106 as a local drive; this is evidenced by the designation of the drive 128b as a remote drive without a corresponding local drive.

In some embodiments, implementation of the methods and systems described herein provides a seamless experience to a user of hardware and software provided by a plurality of networked machines. For example, rather than mapping the drive 128b to the remote computing device 106 and having the remote computing device 106 assign the mapped drive a drive letter based upon letters available to the remote computing device 106, the methods and systems described herein provide functionality for providing a display, in a remotely generated desktop, of data identifying characteristics of the drive 128b that improve the end user experience.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for displaying, on a remote computing device in a networked computing environment, data associated with a drive of a client computing device in the networked computing environment, without mapping the drive on the remote computing device, it will now become apparent to one of skill in the art that other embodiments incorporating the concepts of the invention may be used.

What is claimed is:

1. A method for displaying, in a virtualized desktop executing on a remote computing device, data associated with a client drive of a client computing device, without explicitly mapping the client drive onto the remote computing device, the method comprising:
   (a) establishing, by a first client agent executing on the client computing device, a user session with the remote computing device;
   (b) transmitting, by the first client agent, data identifying one or more characteristics of the client drive of the client computing device to a second client agent executing on the remote computing device;
   (c) generating, by the second client agent, a shell link using the data identifying one or more characteristics of the client drive of the client computing device received from the first client agent in the context of the user session, wherein the shell link comprises a data object that contains information used to access the client drive of the client computing device;
   (d) registering, by the second client agent, an identifier for the shell link in a registry provided by an operating system executing on the remote computing device;
   (e) intercepting, by the second client agent, an enumeration request by the operating system for display of a characteristic of the client drive; and
   (f) displaying, by the second client agent, the data identifying one or more characteristics of the client drive of the client computing device in the virtualized desktop executing on the remote computing device by reading the shell link from the registry.

2. The method of claim 1, wherein the client drive further comprises a Universal Serial Bus (USB) flash drive.

3. The method of claim 2, wherein step (a) further comprises intercepting, by the first client agent, device notifications for the USB flash drive generated by the client computing device, transmitting the device notifications to the second client agent, and modifying by the second client agent the shell link for the USB flash drive responsive to the intercepted device notifications.

4. The method of claim 1, wherein the data identifying one or more characteristics of the client drive of the client computing device further comprises disk space data for the client drive.

5. The method of claim 1, wherein the data identifying one or more characteristics of the client drive of the client computing device further comprises graphical data representative of the client drive.

6. The method of claim 1, wherein the data identifying one or more characteristics of the client drive of the client computing device further comprises a user-assigned alphanumeric string forming a volume name of the client drive.

7. The method of claim 1, further comprising suppressing, by the second client agent, display of the client drive responsive to a security policy.

8. The method of claim 1, further comprising displaying, by the remote computing device, the data identifying one or more characteristics of the client drive of the client computing device as a cursor hovers over the client drive displayed on the remote computing device.

9. A system for displaying, in a virtualized desktop executing on a remote computing device, data associated with a client drive of a client computing device, without explicitly mapping the client drive onto the remote computing device comprising:

the client computing device comprising:
   a computer processor;
   a memory; and
   a first client agent executing on the computer processor of the client computing device
      establishing a user session with the remote computing device; and
      transmitting data identifying one or more characteristics of the client drive of the client computing device to a second client agent executing on the remote computing device; and the remote computing device comprising:
   a computer processor;
   a memory; and
   the second client agent executing on the computer processor of the remote computing device
      receiving data identifying one or more characteristics of the client drive;
      generating a shell link using the received data identifying one or more characteristics of the client drive in the context of the user session, wherein the shell link comprises a data object that contains information used to access the client drive of the client computing device;
      registering an identifier for the shell link in a registry provided by an operating system executing on the remote computing device;
      intercepting an enumeration request by the operating system for display of a characteristic of the client drive; and
      displaying the data identifying one or more characteristics of the client drive of the client computing device in the virtualized desktop executing on the remote computing device by reading the shell link from the registry.

10. The system of claim 9, wherein the client drive further comprises a Universal Serial Bus (USB) flash drive.

11. The system of claim 10, wherein the first client agent intercepts device notifications for the USB flash drive generated by the client computing device, transmits the device notifications to the second client agent, and the second client agent modifies the shell link for the USB flash drive responsive to the intercepted device notifications.

12. The system of claim 9, wherein the data identifying one or more characteristics of the client drive of the client computing device further comprises disk space data for the client drive.

13. The system of claim 9, wherein the data identifying one or more characteristics of the client drive of the client computing device further comprises graphical data representative of the client drive.

14. The system of claim 9, wherein the data identifying one or more characteristics of the client drive of the client computing device further comprises a user-assigned alphanumeric string forming a volume name of the client drive.

15. The system of claim 9, wherein the second client agent suppresses display of the client drive responsive to a security policy.

16. The system of claim 9, wherein the remote computing device displays the data identifying one or more characteristics of the client drive of the client computing device as a cursor hovers over the client drive displayed on the remote computing device.

* * * * *